Patented Apr. 10, 1951

2,547,972

UNITED STATES PATENT OFFICE 2,547,972

HYDROCARBON-SOLUBLE PHTHALO-CYANINES

David I. Randall and Tellis A. Martin, Easton, Pa., assignors to General Aniline & Film Corporation, New York, N. Y., a corporation of Delaware No Drawing. Application January 10, 1950, Serial No. 137,902

7 Claims. (Cl. 260—314.5)

This invention relates to novel compounds of the phthalocyanine series.

More particularly, the invention relates to secondary and tertiary aminomethyl-substituted metal phthalocyanines, especially copper phthalocyanines, which compounds are blue to green solids, soluble in hydrocarbon solvents, possessing excellent light fastness, and suitable for coloration of gasoline, oily printing inks, and hydrophobic resinous polymers, especially of the polyvinyl series, e. g. polystyrene.

The compounds of this invention are prepared from chloromethylated metal phthalocyanines, which can be made, for example, by chloromethylation of a metal phthalocyanine according to the procedure of U. S. P. 2,435,307, involving condensation at elevated temperatures in the presence of aluminum chloride, and preferably of a tertiary amine not susceptible to chloromethylation, of a metal phthalocyanine with symmetrical dichlorodimethyl ether or a reagent such as paraformaldehyde which reacts like dichlorodimethyl ether in the presence of aluminum chloride. The resulting chloromethylated phthalocyanine, containing, for example, 1 to 6 chloromethyl groups per molecule, is reacted with a primary or secondary amine by heating therewith to form secondary or tertiary aminomethyl phthalocyanines of the invention. The latter reaction can be conveniently carried out in the presence of a large excess of the reagent amine which serves as a reaction medium, and also as an acceptor for hydrogen chloride formed in the reaction. Alternatively, an inert solvent such as mono- or dichlorobenzene can be used as the reaction medium, the amount of amine being, in this case, approximately equivalent to the halogen contained in the chloromethyl groups of the chloromethylated phthalocyanine. An alkaline material such as an alkali metal carbonate is advantageously included in the latter reaction mixture as a hydrogen chloride acceptor.

The compounds produced in the aforesaid manner can be precipitated from the reaction mixture by addition of a solvent miscible with the reaction medium but in which the secondary or tertiary aminomethylated phthalocyanine is insoluble. Such a precipitant is, for example, ethanol, or if the reaction medium is a water-soluble amine, water can be employed. The product thus precipitated is filtered out, washed with the precipitant liquid, or another liquid in which it is insoluble, such as acetone. Further purification can be effected by dissolving in a hydrocarbon solvent, filtering the solution, concentrating the filtrate, and reprecipitating the product by diluting with acetone or ethanol.

The amines employed in preparing the secondary and tertiary aminomethyl phthalocyanines of the invention are primary and secondary monoamines and heterocyclic mono-NH- bases containing at least 4 carbon atoms and having no water-solubilizing substituents (e. g. $SO_3H$, COOH, or OH groups) in the radical or radicals attached to the amino nitrogen. The nitrogen substituents of the amines include alkyl, aralkyl, aryl, cycloalkyl and heterocyclic radicals, as well as monocyclic or acyclic divalent radicals forming heterocyclic bases with the —NH— group. Such amines include, for example, butyl-, amyl-, hexyl-, heptyl-, octyl-, nonyl-, decyl-, dodecyl-, and/stearylamines, diethyl-, dipropyl-, dibutyl-, diisobutyl-, diamyl-, dihexyl-, diheptyl-, dioctyl-, dinonyl-, didecyl-, didodecyl-, distearyl-, benzyl- methyl-, dibenzyl-, di-(2-ethylhexyl)-, cyclohexyl-, dicyclohexyl-, and naphthylamines. Further, the amines include aniline, toluidine, anisidine, N-ethylaniline, N-butylaniline, 4-dodecylaniline, 4-hexylaniline, benzyldodecylamine, 4-methoxybenzylbutylamine, α-furfuryl-ethylamine, α-naphthylmethylaminomethane, and as heterocyclic bases, morpholine, piperidine, tetrahydroquinoline, tetrahydroisoquinoline and 2-methylmorpholine.

The products have the general formula:

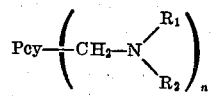

wherein Pcy represents a metal phthalocyanine radical, $R_1$ and $R_2$ represent the substituents of the nitrogen in the mono-primary or secondary amines employed in the preparation of the products, as illustrated above, and $n$ represents an integer of from 1 to 6, and preferably 3 to 4.

Preparation of the compounds of this invention is illustrated by the following examples, wherein parts are by weight unless otherwise expressed, and parts by volume signify the volume of an equal number of parts by weight of water.

Example 1

10 parts of copper tri-(chloromethyl)-phthalocyanine were added slowly, with agitation, to 100 parts of diisobutylamine heated to 80 to 90° C. The temperature of the reaction mixture was raised to its boiling point (135 to 137° C.) over a period of one hour, and then heated under reflux for an additional period of 4 hours. At the end of this time, practically all of the reagents had gone into solution. After cooling to 70° C., the reaction mixture was diluted with 400 parts by volume of ethanol, and the blue solid thereby precipitated was filtered out. The filter cake was washed several times with ethanol and subsequently with acetone, dried, and passed through a sieve containing 100 meshes per linear inch. 8.9 parts of the product were thus obtained. The product can be further purified by slurrying with 200 parts by volume of warm benzene, separating the insoluble material by filtration, concentrating the filtrate by evaporation on a steam bath under reduced pressure, and diluting with acetone. The product, which is copper tri-(di-isobutylaminomethyl)-phthalocyanine, is soluble in benzene, petroleum ether, dioxane and dilute acids, and insoluble in acetone, ethanol and water.

Example 2

10 parts of copper tri-(chloromethyl)-phthalocyanine and 200 parts of didecylamine were mixed at a temperature of 80–90° C., and heated, with agitation, at 130–140° C. for 4 hours. The mixture was then cooled to 60° C., diluted with 300 parts by volume of ethanol, filtered, and the filter cake washed successively with ethanol and acetone. 9.6 parts of the product were obtained in this manner which were purified by slurrying with 200 parts by volume of benzene, filtering out insoluble material, concentrating the filtrate, and diluting with acetone and ethanol, whereby a precipitate was obtained which, on recovery, amounted to 8.2 parts of copper tri-(didecylaminomethyl)-phthalocyanine.

Example 3

200 parts of molten stearylamine were added portionwise at 90 to 100° C., with agitation, to 10 parts of copper tri-(chloromethyl)-phthalocyanine. The reaction mixture was heated at 140 to 150° C. for a period of 3 hours, then cooled, and diluted with 500 parts by volume of absolute ethanol. The resulting precipitate was separated by filtration, and washed several times with ethanol and acetone. 10 parts of pure copper tri-(stearylaminomethyl)-phthalocyanine were recovered upon warming the precipitate with 300 parts by volume of benzene, filtering, concentrating, diluting with acetone and separating the precipitated pigment.

Example 4

5 parts of copper tri-(chloromethyl)-phthalocyanine were added to 50 parts of di-(2-ethylhexyl)-amine at 80 to 90° C., and the reaction mixture was heated at 130 to 140° C. for 4 hours. The mixture was cooled to 80° C., diluted with 100 parts by volume of absolute ethanol, filtered, and the filter cake washed with ethanol and acetone, and dried under reduced pressure at 50° C. 5 parts of copper tri-[di-(2-ethylhexyl)-aminomethyl]-phthalocyanine were thus obtained, which on purification, as described in the preceding example, yielded 3 parts of the pure product.

Example 5

10 parts of copper tri-(chloromethyl)-phthalocyanine were mixed with 200 parts of α-naphthylamine at 80 to 100° C. The mixture was heated at 130 to 140° C. for 4 hours, cooled, diluted with 4 parts by volume of ethanol, filtered, and the filter cake washed with acetone. 10.5 parts of copper tri-(α-naphthylaminomethyl)-phthalocyanine were thus obtained in the form of a blue solid. The product can be purified in accordance with Example 2 to yield a hydrocarbon-soluble blue solid.

Example 6

An agitated mixture of 20 parts of copper tetra-(chloromethyl)-phthalocyanine and 300 parts of monobutylamine were heated at 130 to 140° C. in an autoclave for 4 hours. The mixture was then cooled to room temperature and diluted with 400 parts by volume of ethanol. The mixture was filtered, the filter cake washed, dried, and passed through a 100-mesh screen, yielding 17.8 parts of a blue solid pigment. Purification in accordance with the procedure of the preceding examples yielded pure copper tetra-(butylaminomethyl)-phthalocyanine.

Example 7

30 parts of copper tetra-(chloromethyl)-phthalocyanine were added to an excess of freshly distilled mono-octylamine at 80 to 90° C. After heating for 4 hours at 130 to 150° C., and working up the reaction mixture as described in the preceding examples, 15.5 parts of copper tetra-(octylaminomethyl)-phthalocyanine were recovered. Purification is carried out in the same manner as described above, employing 300 parts by volume of benzene.

Example 8

5 parts of copper tetra-(chloromethyl)-phthalocyanine and 100 parts of monodecylamine were reacted in accordance with the procedure of Example 7. On cooling to 60° C. and diluting with 400 parts by volume of ethanol, 5.5 parts of copper tetra-(decylaminomethyl)-phthalocyanine were obtained in the form of a blue solid. The product is soluble in benzene, dioxane and petroleum ether.

Example 9

20 parts of copper tetra-(chloromethyl)-phthalocyanine and 200 parts of dibutylamine were heated at 125 to 128° C. for 5 hours. The mixture was cooled to 68° C., diluted with 200 parts by volume of absolute ethanol, filtered, and the filter cake washed with ethanol, dried at 50° C. under reduced pressure for 12 hours, and passed through an 80-mesh screen. 11 parts of a blue solid product were thus obtained. The latter was purified by dissolving in 200 parts by volume of dry benzene, filtering, concentrating, and diluting with acetone, whereby a precipitate was recovered by filtration, of pure copper tetra-(dibutylaminomethyl)-phthalocyanine.

Example 10

20 parts of copper tetra-(chloromethyl)-phthalocyanine and 200 parts of diisobutylamine were mixed at 80 to 90° C., the mixture heated under a reflux (136–140° C.) for 4 hours, cooled, diluted with 300 parts by volume of ethanol, filtered, and the filter cake washed with ethanol and acetone, dried, and passed through a 100-mesh screen. 15 parts of a product were obtained which was soluble in benzene, dioxane, petroleum ether, and dilute acids. The product was purified by slurrying with 300 parts of warm benzene, filtering, concentrating the filtrate, diluting with acetone, and separating the precipitate. 8.5 parts of pure copper tetra-(diisobutylaminomethyl)-phthalocyanine were obtained.

Example 11

20 parts of copper tetra-(chloromethyl)-phthalocyanine and 200 parts of diamylamine were mixed at 80 to 90° C. and heated at 125 to 135° C. for 4 hours. After cooling, the mixture was diluted with 1000 parts by volume of acetone, filtered, and the filter cake washed with ethanol and acetone, yielding 14 parts of a blue product. Purification in the manner described in the preceding examples, employing 200 parts by volume of benzene, yielded 10.7 parts of copper tetra-(diamylaminomethyl)-phthalocyanine.

Example 12

5 parts of copper tetra-(chloromethyl)-phthalocyanine and 100 parts of dioctylamine were mixed at 94° C. The mixture was then heated at 130 to 140° C. for 4 hours. On cooling to 60° C., diluting with 200 parts by volume of ethanol, filtering and washing the filter cake, 3 parts of copper tetra-(dioctylaminomethyl)-phthalocyanine were obtained as a blue solid.

Example 13

5 parts of copper tetra-(chloromethyl)-phthalocyanine and 100 parts of didecylamine were mixed and heated at 130–140° C. for 4 hours. The reaction mixture was worked up by the procedure set out in the preceding example. 4 parts of a blue product were obtained. Purification of this material employing 200 parts by volume of benzene yielded pure copper tetra-(didecylaminomethyl)-phthalocyanine.

Instead of employing the amine as the reaction medium, the same compound can be prepared by heating together a mixture of 300 parts by volume of dry chlorobenzene, 106.8 parts of didecylamine and 23 parts of copper tetra-(chloromethyl)-phthalocyanine under reflux at 135 to 140° C. for 4 hours. The reaction mixture was diluted with 400 parts by volume of toluene, filtered, and the filtrate concentrated by evaporation, diluted with 500 parts by volume of absolute ethanol, and recovering the resulting precipitate. 20 parts of pure copper tetra-(didecylaminomethyl)-phthalocyanine were thus obtained in the form of a dark blue solid.

Example 14

30 parts of copper tetra-(chloromethyl)-phthalocyanine and 300 parts of cyclohexylamine were reacted in accordance with the procedure of Example 4. 31.5 parts of copper tetra-(cyclohexylaminomethyl)-phthalocyanine were thus obtained.

Example 15

A mixture of 10 parts of copper tetra-(chloromethyl)-phthalocyanine with 100 parts of 4-dodecylaniline were heated, with agitation, at 130 to 140° C. for 4 hours. The reaction product was isolated and purified in accordance with the procedure of Example 3. 12.8 parts of the product were initially obtained, yielding on purification, 6 parts of pure copper tetra-(4-dodecylphenylaminomethyl)-phthalocyanine which were obtained in the form of a green solid.

Example 16

200 parts of N-ethyl-aniline were mixed at 80 to 90° C. with 20 parts of copper tetra-(chloromethyl)-phthalocyanine. The reaction mixture was heated, with agitation, at 130 to 150° C. for 4 hours, and worked up as described in the preceding examples. 12 parts of copper tetra-(N-phenyl-N-ethylaminomethyl)-phthalocyanine were initially obtained which, on purification, yielded 9 parts of the purified product.

Example 17

2.5 parts of copper tetra-(chloromethyl)-phthalocyanine and 25 parts of N-butylaniline were reacted in accordance with the procedure of the preceding example. 2 parts of copper tetra-(N-butyl-N-phenylaminomethyl)-phthalocyanine were thus obtained.

Example 18

20 parts of copper tetra-(chloromethyl)-phthalocyanine were added, with agitation, to 200 parts of morpholine at 90 to 100° C. The reaction mixture was heated under reflux (125 to 128° C.) for 4 hours. The reaction mixture was allowed to cool, diluted with 1000 parts of water, and filtered. The filter cake was washed a number of times with water, and then with ethanol and finally with acetone. 17 parts of a dark blue solid were thus obtained. Purification in the manner described in the other examples yielded 8 parts of pure copper tetra-(morpholinylmethyl)-phthalocyanine.

An alternative method for preparing the same compound involved heating a mixture of 300 parts by volume of chlorobenzene, 87 parts of morpholine and 23 parts of copper tetra-(chloromethyl)-phthalocyanine under reflux at 135 to 140° C. for 4 hours. The mixture was filtered while hot, the filtrate concentrated by evaporation, and the residue diluted with ethanol, whereby 12 parts of a pure product were obtained.

Example 19

20 parts of copper tetra-(chloromethyl)-phthalocyanine and 200 parts of piperidine were heated under reflux (106° C.) for 5 hours. The reaction mixture was worked up in accordance with the first procedure of Example 18, whereby 15.5 parts of copper tetra-(piperidylmethyl)-phthalocyanine were recovered. 11 parts of a purified product were obtained in the manner described in the other examples.

Example 20

20 parts of copper tetra-(chloromethyl)-phthalocyanine were added to an agitated mixture of 20 parts of diisobutylamine, 30 parts of diamylamine, 40 parts of dihexylamine, 50 parts of dioctylamine, and 60 parts of didecylamine, previously heated to 80 to 90° C. The resulting mixture was then heated at 130 to 140° C. for 4 hours, and worked up in accordance with the procedure of Example 4. 24 parts of a mixed copper tetra-(dialkylaminomethyl)-phthalocyanine were thus obtained, which yielded 12 parts of the purified product when purified as described in the other examples.

Example 21

23 parts of copper tetra-(chloromethyl)-phthalocyanine were added to an agitated mixture of 120.5 parts of di-(2-ethylhexyl)-amine and 300 parts by volume of dry chlorobenzene at 80–90° C. The mixture was then heated under reflux (135 to 140° C.) for 4 hours, and filtered while hot. The blue filtrate was concentrated, and the reaction product precipitated by addition of ethanol. The precipitate, recovered by filtration and washing, amounted to 19.5 parts of copper tetra-[di-(2- ethylhexyl)-aminomethyl]-phthalocyanine.

In the procedures employed in the foregoing examples, suitable reaction temperatures range from 100 to 160° C. The reaction generally requires 3 to 5 hours. In addition to the amino compounds serving as the reagents, suitable reaction media include inert water-immiscible high-boiling solvents such as chlorobenzene, dichlorobenzene, and the like. The solvents employed are preferably miscible with precipitant liquids such as alcohol or acetone. Alkaline materials such as sodium carbonate or potassium carbonate can be included when inert solvents are employed as the reaction media to absorb hydrogen chloride liberated by the reaction. Such inorganic hydrogen chloride acceptors are preferably used in an amount equivalent to the halogen present in the chloromethyl groups of the chloromethylated phthalocyanine. When the reagent amine itself is employed as the reaction medium, the amount is preferably in excess of twice the equivalent of the replaceable chlorine in the chloromethyl groups of the phthalocyanine compounds.

Instead of the chloromethylated copper phthalocyanines employed in the foregoing examples, other metal phthalocyanines can be used, e. g. nickel, iron, or aluminum phthalocyanines containing chloromethyl groups.

The products obtained are soluble in hydrocarbon solvents such as gasoline, petroleum ether, benzene, as well as dioxane, yielding blue to green solutions. The products are characterized by exceptional fastness to light. They are likewise useful as pigments for use in oily printing inks, and for the coloration of hydrophobic vinyl resins such as polystyrene.

Variations and modifications which will be obvious to those skilled in the art can be made in the foregoing procedures without departing from the nature or scope of the invention.

We claim:

1. A hydrocarbon-soluble metal phthalocyanine containing 1 to 6 amino methyl groups as nuclear substituents in the benzene rings of the phthalocyanine nucleus, said amino methyl groups having not more than one hydrogen attached to the nitrogen atoms thereof, and wherein the other radicals attached to the amino methyl groups contain no water-solubilizing groups, and at least one of said radicals contains at least 4 carbon atoms.

2. Hydrocarbon-soluble metal phthalocyanines as defined in claim 1, wherein the metal is copper.

3. Copper tri-(diisobutylaminomethyl)-phthalocyanine.

4. Copper tetra-(decylaminomethyl)-phthalocyanine.

5. A process which comprises heating a chloromethylated metal phthalocyanine at a temperature of 100 to 160° C. with a monoamino compound containing at least one hydrogen attached to the amino nitrogen, and containing no water-solubilizing groups, in an amount at least equivalent to the chlorine contained in the chloromethyl groups of the phthalocyanine.

6. A process as defined in claim 5, in which the reaction is carried out in the presence of an excess of the amino compound.

7. A process as defined in claim 5, in which the reaction mixture includes a hydrogen halide acceptor.

DAVID I. RANDALL.
TELLIS A. MARTIN.

No references cited.